Patented Apr. 23, 1940

2,198,207

UNITED STATES PATENT OFFICE 2,198,207

COFFEE

Sidney Musher, New York, N. Y., assignor to Musher Foundation Incorporated, New York, N. Y., a corporation of New York No Drawing. Application October 28, 1939, Serial No. 301,756

6 Claims. (Cl. 99—152)

This application relates to retarding the development of staleness and to improving the quality of roasted coffee and is a continuation in part of application, Serial No. 102,631, filed September 25, 1936, and through said application of application, Serial No. 57,856 filed January 6, 1936, which in turn was copending with application Serial No. 3,876 filed January 28, 1935, which matured into Patent No. 2,026,697 on January 7, 1936.

In accordance with the present invention, unroasted green coffee beams are subjected to a grinding operation to produce green coffee bean flour and the green coffee bean flour thus obtained is utilized in a small amount in the treatment of roasted coffee and is applied preferably in aqueous suspension or dispersion to the whole coffee beans while they are at an elevated temperature in excess of 250° F. and desirably between 400° F. and 450° F. and following the roasting operation.

The whole green coffee beans are ground either in a hammer or attrition mill or otherwise pulverized and preferably the green coffee beans are ground to 20 mesh and desirably to about 48 mesh or more. The green coffee bean flour thus obtained has a characteristic grass or hay odor which is entirely dissipated after application to the roasted coffee.

The coffee beans are first roasted by being subjected to a direct flame treatment and as soon as the roasting operation has been completed and the beans are of the desired roasted color, aroma and flavor, the green coffee bean flour, preferably in aqueous disperson or suspension, is applied to the hot roasted coffee beans by being sprayed on those beans in the roasting chamber and while the beans are at the high temperature of roasting. Generally, the beans at this point are at a temperature of between 300° F. and 400° F. or more so that at the application of the green coffee bean flour in aqueous dispersion, the beans are suddenly reduced in temperature and no further roasting can take place.

There may be applied to the roasted coffee beans a small amount, generally under 5% and preferably about 2% or less, of the green coffee bean flour against the weight of the roasted coffee. From 1% to 2% of the green coffee bean flour gives satisfactory results.

Where, for example, 40 pounds of water are applied to 500 pounds of roasted coffee beans in the cylinder and at the completion of the roasting operation there may be added to the 40 pounds of water before being sprayed on the beans in the roasting chamber 10 pounds of green coffee bean flour, the flour having first been added to the 40 pounds of water, and 50 pounds of the combination of the water and green coffee bean flour being applied to the roasted coffee beans in the cylinder immediately as the flame is extinguished and while the beans are at the elevated temperature of roasting, substantially above 250° F.

At the time of application of the water containing the green coffee bean flour to the roasted beans while they are at the elevated temperature, it is estimated that about 60% to 70% or possibly more of the water which is applied to the roasted coffee beans in this manner is immediately converted to steam and only a small proportion remains in the roasted coffee beans.

The roasted coffee beans thus treated may be ground or otherwise processed as in the manufacture of various grades of ground roasted coffee and the ground coffee shows no difference in appearance after this treatment.

The green coffee bean flour adheres more completely to the roasted coffee beans and is much less objectionable from the standpoint of the appearance of the whole roasted coffee beans than where the green coffee bean flour is applied to the whole roasted coffee beans after they have been allowed to cool.

Green coffee bean flour may also less preferably be mixed with the roasted coffee after the coffee has been ground, or the green coffee beans in ground or bean condition may be added to the whole roasted coffee beans followed by grinding.

In addition to the enhanced stabilizing effect when the green coffee bean flour is applied to the roasted coffee while the roasted coffee is at the elevated temperature, it has also been found that the green coffee bean flour tends to absorb some of the oil which is exuded at the surface of the roasted coffee and thereby there is less oil formation on the coffee beans after grinding and during normal storage or distribution.

As a result of the treatment described in accordance with this invention, the roasted coffee is stabilized to a marked degree against oxidative deterioration, and the development of staleness and off-odors and rancidity is materially retarded, giving the coffee a finer flavor and aroma at the time of final consumption in the home.

In addition to using the green coffee bean flour, there may similarly be employed the water and alcoholic extracts of the coffee bean flour. For example, the green coffee beans or green coffee bean flour may be extracted with water, preferably acidified to a pH of about 4.5 to 7.0, and desirably at a temperature between about 125° F. and 145° F., removing the water soluble portion by filtration, siphoning or centrifuging and then concentrating the water extract to be used for addition to the roasted coffee immediately following the roasting operation and while the coffee beans are at the elevated temperature of roasting. Concentration of the water extract is not necessary where the unconcentrated extract may be utilized in place of water alone.

In addition to the use of water as a solvent, alcohol, with or without water, may also be employed such as methyl, ethyl, propyl or butyl alcohol and other solvents having the formula XOH where X is a low molecular weight aliphatic compound. Where the alcohols are employed for the extraction of the green coffee beans or the green coffee bean flour, the solvent may be entirely removed by evaporation before application to the roasted coffee, desirably at the elevated temperature.

Where the water or alcoholic extracts of green coffee bean flour are utilized in the teratment of roasted coffee, smaller proportions may be employed such as between 0.05% and 2% of the extract against the weight of the roasted coffee.

It is particularly surprising to observe the antioxygenic effect of the green coffee bean flour as applied to the roasted coffee beans in view of the fact that either the green coffee bean flour or roasted coffee bean flour is a good antioxidant when used for addition to the glyceride oils such as for addition to lard, tallow, oleo oil, cottonseed oil, corn oil, soya bean oil, tea seed oil, cod liver oil, butter and other glyceride oils and fats and compositions containing the same with or without subsequent heating to above 250° F. in amounts of 0.1% to 5%.

Having described my invention, what I claim is:

1. A method of stabilizing roasted coffee which comprises applying to the roasted coffee immediately following roasting and while the coffee beans are at a temperature in excess of 250° F. a small amount of green coffee bean flour in aqueous dispersion.

2. A substantially stabilized roasted ground coffee comprising a combination of a small quantity of a green coffee bean flour, ground to over 48 mesh, with roasted coffee.

3. A method of stabilizing roasted coffee which comprises applying to the roasted coffee, immediately following the roasting and while the coffee beans are at a temperature in excess of 250° F., a small amount of an antioxygenic material selected from the group consisting of green coffee bean flour and its water and alcohol soluble extracts.

4. A substantially stabilized roasted ground coffee comprising a combination of a small quantity of an antioxygenic material selected from the group consisting of green coffee bean flour and its water and alcohol soluble extracts, with the roasted coffee.

5. A method of stabilizing roasted coffee which comprises treating said coffee with a small quantity of green coffee bean flour.

6. A substantially stabilized roasted coffee comprising a relatively small proportion, less than 5%, of an antioxygenic green coffee bean flour.

SIDNEY MUSHER.